United States Patent
Duggan et al.

(10) Patent No.: US 8,380,425 B2
(45) Date of Patent: Feb. 19, 2013

(54) AUTONOMOUS COLLISION AVOIDANCE SYSTEM FOR UNMANNED AERIAL VEHICLES

(75) Inventors: David S. Duggan, Aubrey, TX (US); David A. Felio, Highland Village, TX (US); Craig S. Askew, Highland Village, TX (US)

(73) Assignee: L-3 Unmanned Systems, Inc., Carrollton, TX (US)

( * ) Notice: Subject to any disclaimer, the term of this patent is extended or adjusted under 35 U.S.C. 154(b) by 153 days.

(21) Appl. No.: 12/880,292

(22) Filed: Sep. 13, 2010

(65) Prior Publication Data

US 2010/0332136 A1 Dec. 30, 2010

Related U.S. Application Data

(63) Continuation of application No. 10/872,144, filed on Jun. 18, 2004, now Pat. No. 7,818,127.

(51) Int. Cl.
*G08G 5/04* (2006.01)

(52) U.S. Cl. .............. 701/301; 701/2; 701/10; 701/300; 701/302; 244/3.1; 244/3.11; 244/3.15; 244/3.16; 244/3.21; 244/75.1; 244/76 R; 244/175; 244/181; 244/190; 244/195; 340/903; 340/961; 340/963; 342/29; 342/63; 342/65; 342/113; 342/118; 342/119

(58) Field of Classification Search .......... 701/300–302; 340/901–903, 945–961, 963–983, 425.5, 340/436; 342/29–51, 455; 345/958; 700/90, 700/245, 250, 255
See application file for complete search history.

(56) References Cited

U.S. PATENT DOCUMENTS

| | | | |
|---|---|---|---|
| 3,025,514 A | 3/1962 | Alexander et al. | |
| 4,155,525 A | 5/1979 | Peter-Contesse | |
| 4,611,771 A | 9/1986 | Gibbons et al. | |
| 4,642,774 A | 2/1987 | Centala et al. | |
| 4,725,956 A | 2/1988 | Jenkins | |
| 4,868,755 A | 9/1989 | McNulty et al. | |
| 5,042,743 A | 8/1991 | Carney | |
| 5,048,771 A | 9/1991 | Siering | |
| 5,123,610 A | 6/1992 | Oaks | |
| 5,181,673 A | 1/1993 | Hubricht et al. | |
| 5,214,584 A | 5/1993 | Dingee et al. | |
| 5,240,207 A | 8/1993 | Eiband et al. | |
| 5,313,201 A * | 5/1994 | Ryan | 340/961 |
| 5,321,489 A * | 6/1994 | Defour et al. | 356/4.01 |
| 5,422,998 A | 6/1995 | Margolin | |

(Continued)

OTHER PUBLICATIONS

Parrish, R. et al.; "Spatial Awareness Comparisons Between Large-Screen, Integrated Pictorial Displays and Conventional EFIS Displays During Simulated Landing Approaches," NASA Technical Paper 3467, CECOM Technical Report 94-E-1, Oct. 1994, 29 pgs.

(Continued)

*Primary Examiner* — Jonathan M Dager
(74) *Attorney, Agent, or Firm* — Westman, Champlin & Kelly, P.A.

(57) ABSTRACT

Autonomous collision avoidance systems for unmanned aerial vehicles are disclosed. Systems illustratively include a detect and track module, an inertial navigation system, and an auto avoidance module. The detect and track module senses a potential object of collision and generates a moving object track for the potential object of collision. The inertial navigation system provides information indicative of a position and a velocity of the unmanned aerial vehicle. The auto avoidance module receives the moving object track for the potential object of collision and the information indicative of the position and the velocity of the unmanned aerial vehicle. The auto avoidance module utilizes the information to generate a guidance maneuver that facilitates the unmanned aerial vehicle avoiding the potential object of collision.

19 Claims, 6 Drawing Sheets

U.S. PATENT DOCUMENTS

| | | | |
|---|---|---|---|
| 5,448,233 A * | 9/1995 | Saban et al. | 340/963 |
| 5,522,567 A | 6/1996 | Kinstler | |
| 5,552,983 A | 9/1996 | Thornberg et al. | |
| 5,553,229 A | 9/1996 | Margolin | |
| 5,566,073 A | 10/1996 | Margolin | |
| 5,566,074 A * | 10/1996 | Hammer | 701/301 |
| 5,581,250 A * | 12/1996 | Khvilivitzky | 340/961 |
| 5,605,307 A | 2/1997 | Batchman et al. | |
| 5,666,531 A | 9/1997 | Martin | |
| 5,691,531 A | 11/1997 | Harris et al. | |
| 5,782,429 A | 7/1998 | Mead | |
| 5,822,515 A | 10/1998 | Baylocq | |
| 5,839,080 A | 11/1998 | Muller et al. | |
| 5,904,724 A | 5/1999 | Margolin | |
| 5,933,156 A | 8/1999 | Margolin | |
| 5,938,148 A | 8/1999 | Orenstein | |
| 5,944,762 A | 8/1999 | Bessacini et al. | |
| 5,951,607 A | 9/1999 | Senn et al. | |
| 5,951,609 A | 9/1999 | Hanson et al. | |
| 5,974,423 A | 10/1999 | Margolin | |
| 5,978,488 A | 11/1999 | Margolin | |
| 5,993,156 A | 11/1999 | Margolin | |
| 6,021,374 A * | 2/2000 | Wood | 701/301 |
| 6,023,278 A | 2/2000 | Margolin | |
| 6,025,790 A | 2/2000 | Saneyoshi | |
| 6,057,786 A * | 5/2000 | Briffe et al. | 340/975 |
| 6,062,513 A | 5/2000 | Lambregts | |
| 6,064,939 A | 5/2000 | Nishida et al. | |
| 6,076,042 A * | 6/2000 | Tognazzini | 701/301 |
| 6,092,009 A | 7/2000 | Glover | |
| 6,122,570 A | 9/2000 | Muller et al. | |
| 6,122,572 A * | 9/2000 | Yavnai | 701/23 |
| 6,138,060 A | 10/2000 | Conner et al. | |
| 6,177,943 B1 | 1/2001 | Margolin | |
| 6,219,592 B1 | 4/2001 | Muller et al. | |
| 6,262,679 B1 | 7/2001 | Tran | |
| 6,304,819 B1 | 10/2001 | Agnew et al. | |
| 6,314,366 B1 | 11/2001 | Farmakis et al. | |
| 6,377,436 B1 | 4/2002 | Margolin | |
| 6,393,362 B1 * | 5/2002 | Burns | 701/301 |
| 6,498,984 B2 | 12/2002 | Agnew et al. | |
| 6,584,382 B2 | 6/2003 | Karem | |
| 6,584,383 B2 | 6/2003 | Pippenger | |
| 6,748,325 B1 * | 6/2004 | Fujisaki | 701/301 |
| 6,778,906 B1 * | 8/2004 | Hennings et al. | 701/301 |
| 6,798,423 B2 * | 9/2004 | Wilkins et al. | 345/618 |
| 6,804,607 B1 * | 10/2004 | Wood | 701/301 |
| 6,826,458 B2 * | 11/2004 | Horvath et al. | 701/3 |
| 6,847,865 B2 | 1/2005 | Carroll | |
| 6,862,501 B2 | 3/2005 | He | |
| 6,885,874 B2 | 4/2005 | Grube et al. | |
| 6,909,381 B2 | 6/2005 | Kahn | |
| 6,917,863 B2 * | 7/2005 | Matos | 701/16 |
| 6,975,246 B1 * | 12/2005 | Trudeau | 340/903 |
| 7,010,398 B2 * | 3/2006 | Wilkins et al. | 701/3 |
| 7,057,549 B2 * | 6/2006 | Block | 342/65 |
| 7,124,000 B2 * | 10/2006 | Horvath et al. | 701/3 |
| 7,132,982 B2 * | 11/2006 | Smith et al. | 342/456 |
| 7,158,073 B2 * | 1/2007 | Ybarra | 342/29 |
| 7,190,303 B2 * | 3/2007 | Rowlan | 342/29 |
| 7,212,918 B2 * | 5/2007 | Werback | 701/120 |
| 7,343,232 B2 | 3/2008 | Duggan et al. | |
| 7,349,774 B2 * | 3/2008 | Werback | 701/3 |
| 7,693,624 B2 | 4/2010 | Duggan et al. | |
| 7,818,127 B1 | 10/2010 | Duggan et al. | |
| 2002/0055909 A1 | 5/2002 | Fung et al. | |
| 2002/0080059 A1 | 6/2002 | Tran | |
| 2002/0133294 A1* | 9/2002 | Farmakis et al. | 701/301 |
| 2002/0152029 A1 | 10/2002 | Sainthuile et al. | |
| 2003/0014165 A1* | 1/2003 | Baker et al. | 701/3 |
| 2003/0046025 A1* | 3/2003 | Jamieson et al. | 702/159 |
| 2003/0122701 A1* | 7/2003 | Tran | 342/29 |
| 2003/0132860 A1* | 7/2003 | Feyereisen et al. | 340/973 |
| 2003/0182060 A1* | 9/2003 | Young | 701/301 |
| 2004/0193334 A1 | 9/2004 | Carlsson et al. | |
| 2004/0217883 A1* | 11/2004 | Judge et al. | 340/946 |
| 2004/0239529 A1* | 12/2004 | Tran | 340/961 |
| 2005/0004723 A1 | 1/2005 | Duggan et al. | |
| 2005/0055143 A1* | 3/2005 | Doane | 701/30 |
| 2005/0057372 A1 | 3/2005 | Taylor | |
| 2005/0077424 A1* | 4/2005 | Schneider | 244/3.11 |
| 2005/0256938 A1 | 11/2005 | Margolin | |
| 2006/0097895 A1* | 5/2006 | Reynolds et al. | 340/961 |
| 2006/0142903 A1* | 6/2006 | Padan | 701/3 |
| 2007/0093945 A1 | 4/2007 | Grzywna et al. | |
| 2009/0048723 A1* | 2/2009 | Nugent et al. | 701/10 |
| 2009/0125163 A1 | 5/2009 | Duggan et al. | |
| 2010/0121575 A1* | 5/2010 | Aldridge et al. | 701/301 |
| 2010/0256909 A1 | 10/2010 | Duggan et al. | |
| 2010/0292873 A1 | 11/2010 | Duggan et al. | |
| 2010/0292874 A1 | 11/2010 | Duggan et al. | |

OTHER PUBLICATIONS

Parent U.S. Appl. No. 10/872,144, filed Jun. 18, 2004.

Airspace Integration for Unmanned Aviation, Office of the Secretary of Defense, Nov. 2004. 69 pgs.

Beringer, Dennis. "Applying Performance-Controlled Systems, Fuzzy Logic, and Fly-By-Wire Controls to General Aviation," Office of Aerospace Medicine, Washington, DC 20591, May 2002, 12 pgs.

RIS Press Release, NASA Tele-Operates SCOUT Rover using SmartCam3D, Sep. 15, 2005, Meteor Crater, AZ, pp. 1-4, downloaded www.landform.com/pages/PressReleases.htm on Nov. 17, 2005.

Abernathy, Michael F. "Virtual Cockpit Window" for a Windowless Aerospacecraft, www.nasatech.com/Briefs/Jan03/MS23096.html, downloaded dated Nov. 17, 2005. 2 pgs.

Official Action dated Sep. 26, 2006 for related U.S. Appl. No. 10/872,144, filed Jun. 18, 2004.

Final Official Action dated May 31, 2007 for related U.S. Appl. No. 10/872,144, filed Jun. 18, 2004.

Official Action dated Feb. 4, 2008 for related U.S. Appl. No. 10/872,144, filed Jun. 18, 2004.

Final Official Action dated Sep. 16, 2008 for related U.S. Appl. No. 10/872,144, filed Jun. 18, 2004.

Office Action dated May 20, 2009 for related U.S. Appl. No. 10/872,144, filed Jun. 18, 2004.

Final Office Action dated Dec. 8, 2009 for related U.S. Appl. No. 10/872,144, filed Jun. 18, 2004.

Notice of Allowance dated Jul. 8, 2010 for related U.S. Appl. No. 10/872,144, filed Jun. 18, 2004.

RIS Press Release, "Landform Situation Aware," pp. 1-4, http://www.landform.com/pages/PressReleases.htm (last viewed on Nov. 17, 2005).

Beringer, Dennis.; "Applying Performance-Controlled Systems, Fuzzy Logic, and Fly-By-Wire Controls to Generate Aviation Office of Aerospace Medicine," May 2002, pp. 1-14.

Parrish, Russell et al.; "Spatial Awareness Comparisons Between Large-Screen, Integrated Pictorial Displays and Conventional EFIS Displays During Simulated Landing Approaches," NASA Technical Paper 3467, CECOM Technical Report 94-E-1, Oct. 1994, pp. 1-30.

Office of the Secretary of Defense, "Airspace Integration Plan for Unmanned Aviation," Nov. 2004, pp. 1-76.

Abernathy, Michael, "Virtual Cockpit Window" for a Windowless Aerospacecraft, Jan. 2003, pp. 1-2, http://www.nasatech.com/Briefs/Jan03/MSC23096.html (last viewed Nov. 17, 2005).

Guckenberger, Dr. Donald, Matt Archer, and Michael R. Oakes, "UCAV Distributed Mission Training Testbed: Lessons Learned and Future Challenges," Conference Theme: Partnerships for Learning in the New Millennium, 2000, pp. 1 and 7.

Swihart, Donald, Finley Barfield, Bertill Brannstrom, Michael Cawood, Russsell Turner, and Jonas Lovgren, "Results of a Joint US/Swedish Auto Ground Collision Avoidance System Program," Sep. 13-18, 1998, pp. 1-8, 17 and 18, International Council of the Aeronautical Sciences (ICAS) and American Institute of Aeronautics and Astronautics, Inc. (AIAA), Melbourne, Australia.

Leavitt, Charles A., "Real-Time In-Flight Planning," Aerospace and Electronics Conference, May 1996, pp. 1-7.

Margolin, Jed, "Response to a Non-Final Office Action mailed on Sep. 1, 2010," U.S. Appl. No. 11/736,356, pp. 1-76.

Margolin, Jed, Declaration of Jed Margolin, "Response to a Non-Final Office Action mailed on Sep. 1, 2010," U.S. Appl. No. 11/736,356, pp. 77-79.

Margolin, Jed, Exhibit 1, "AWST Article NASA Plans UAS Push," Response to a Non-Final Office Action mailed on Sep. 1, 2010, U.S. Appl. No. 11/736,356, p. 80-81.

Margolin, Jed, Exhibit 2, "Duggan Filewrapper Documents," Response to a Non-Final Office Action mailed on Sep. 1, 2010, U.S. Appl. No. 11/736,356, p. 82-89.

Margolin, Jed, Exhibit 3, "Geneva License Agreement," Response to a Non-Final Office Action mailed on Sep. 1, 2010, U.S. Appl. No. 11/736,356, p. 90-107.

Margolin, Jed, Exhibit 4, "Public Records from Palm Beach County, Florida," Response to a Non-Final Office Action mailed on Sep. 1, 2010, U.S. Appl. No. 11/736,356, p. 108-178.

Margolin, Jed, Exhibit 5, "UCAV Distributed Mission Training Testbed: Lessons Learned and Future Challenges," Response to a Non-Final Office Action mailed on Sep. 1, 2010, U.S. Appl. No. 11/736,356, p. 179-183.

Margolin, Jed, Exhibit 6, "Documents from Geneva Aerospace Trademark Applications, Serial No. 78/355,947 for Variable Autonomy Control System" From USPTO Trademark Document Retrieval Web Site, Response to a Non-Final Office Action mailed on Sep. 1, 2010, U.S. Appl. No. 11/736,356, p. 184-188.

Margolin, Jed, Exhibit 7, "Documents from Geneva Aerospace Trademark Application, Serial No. 78/355,939 for 'VACS' From USPTO Trademark Document Retrieval Web Site," Response to a Non-Final Office Action mailed on Sep. 1, 2010, U.S. Appl. No. 11/736,356, p. 189-193.

Margolin, Jed, Exhibit 8, "Development and Testing of a Variable Autonomy Control System (VACS) for UAVs, by Dave Duggan of Geneva Aerospace and Luis A. Piñeiro of AFRL contained in the Proceedings AUVSI Symposium, 2002," Response to a Non-Final Office Action mailed on Sep. 1, 2010, U.S. Appl. No. 11/736,356, p. 194-209.

Margolin, Jed, Exhibit 9, "From Geneva Aerospace U.S. Appl. No. 60/480,192 Small Business Innovation Research (SBIR) Program Projects Summary, Topic No. AF98-179," Response to a Non-Final Office Action mailed on Sep. 1, 2010, U.S. Appl. No. 11/736,356, p. 210-233.

Margolin, Jed, Exhibit 10, "Geneva Phase I Contract Information for AF98-179 from Air Force SBIR Website," Response to a Non-Final Office Action mailed on Sep. 1, 2010, U.S. Appl. No. 11/736,356, p. 234-235.

Margolin, Jed, Exhibit 11, "IDS From Duggan U.S. Appl. No. 60/480,192," Response to a Non-Final Office Action mailed on Sep. 1, 2010, U.S. Appl. No. 11/736,356, p. 236-241.

Prosecution documents associated with U.S. Appl. No. 10/872,144, including: Application filed Jun. 18, 2004; Office Action mailed Sep. 26, 2006; Final Office Action mailed May 31, 2007; Office Action mailed Feb. 4, 2008; Final Office Action mailed Sep. 16, 2008; Office Action mailed May 20, 2009; Final Office Action mailed Dec. 8, 2009; and Notice of Allowance mailed Jul. 8, 2010.

Prosecution documents associated with U.S. Appl. No. 12/956,735, including: Office Action mailed Mar. 22, 2011.

Official Action dated Apr. 11, 2011 for U.S. Appl. No. 12/712,581, filed Feb. 25, 2010.

Official Action dated May 31, 2011 for U.S. Appl. No. 12/956,722, filed Nov. 30, 2010.

Official Action dated Apr. 11, 2011 for U.S. Appl. No. 12/712,548, Feb. 25, 2010.

Notice of Allowance dated Aug. 12, 2011, for related U.S. Appl. No. 12/712,581, filed Feb. 25, 2010.

Notice of Allowance dated Aug. 9, 2011, for related U.S. Appl. No. 12/956,722, filed Nov. 30, 2010.

* cited by examiner

AUTONOMOUS COLLISION AVOIDANCE SYSTEM FOR UNMANNED AERIAL VEHICLES

REFERENCE TO RELATED CASE

The present application is a continuation of and claims the priority of application Ser. No. 10/872,144 filed on Jun. 18, 2004, the content of which is hereby incorporated by reference in its entirety.

BACKGROUND

Many vehicles, such as aircraft vehicles, have systems which use radar for detecting potential objects of collision, such as terrain and other vehicles. Radar can detect potential objects of collision located within a certain proximity to the aircraft vehicle. Upon radar detecting the presence of a potential object of collision, a warning signal is provided to a pilot of the aircraft. The pilot must then analyze the object and determine if action needs to be taken in order to avoid the object. If action needs to be taken, the pilot obeys general aviation and etiquette rules promulgated by the FAA (Federal Aviation Administration) to regulate aircraft vehicle traffic in national air space (NAS).

These types of conventional avoidance systems are very expensive. Therefore, integrating such a system on smaller vehicles is not entirely feasible. In addition, these conventional avoidance systems detect potential objects of collision and provide warning signals only. Thus, conventional avoidance systems rely on the presence of a pilot to recognize the signal and take appropriate action by altering the course of the vehicle.

The potential for collisions is even greater in the context of unmanned vehicle systems. In one application of such a technology, a remotely located operator manages and controls an unmanned aerial vehicle (UAV), typically from a ground control station. Although the ground control station enables some degree of controlled flight, generally, UAVs lack the ability to scout out their surrounding airspace and watch for incoming obstacles. Even if a UAV is equipped with some sort of forward-looking camera or video capability, the remotely located operator is primarily focused on payload and mission operations and has a limited ability to accurately interpret and analyze video information. In addition, under the circumstances, a remotely located operator may have a difficult time complying with the FAA rules for flying in civilian airspace.

Currently, UAVs are not allowed to fly in NAS. In particular, UAVs are not allowed to fly in any air space unless the UAV has received FAA approval. One of the most significant technology barriers for integrating UAVs into NAS is an effective and reliable collision avoidance system. Overcoming this technology barrier will open beneficial services to the national civilian marketplace such as forest management, mineral surveys, border patrol, agriculture and pipeline and power line inspections. Beyond these and other specific potential UAV markets, an effective and reliable collision avoidance system can provide pilots an additional mechanism to safely fly manned aircraft.

SUMMARY

Embodiments of the present disclosure include autonomous collision avoidance systems for unmanned aerial vehicles. Systems illustratively include a detect and track module, an inertial navigation system, and an auto avoidance module. The detect and track module senses a potential object of collision and generates a moving object track for the potential object of collision. The inertial navigation system provides information indicative of a position and a velocity of the unmanned aerial vehicle. The auto avoidance module receives the moving object track for the potential object of collision and the information indicative of the position and the velocity of the unmanned aerial vehicle. The auto avoidance module utilizes the information to generate a guidance maneuver that facilitates the unmanned aerial vehicle avoiding the potential object of collision.

BRIEF DESCRIPTION OF THE DRAWINGS

FIG. 4-1 illustrates a geodetic reference frame and local vertical coordinate frame.

FIG. 4-2 illustrates a local vertical reference frame with respect to a geodetic reference frame.

DETAILED DESCRIPTION

Much of the description of the present invention will be devoted to describing embodiments in the context of unmanned aerial vehicles (UAV). However, it is to be understood that the embodiments of the present invention pertain to a collision avoidance system and are designed for broad application. The embodiments can be adapted by one skilled in the art to be applied in the context of any of a variety of unmanned and manned vehicles including, but not limited to, airplanes, helicopters, missiles, submarines, balloons or dirigibles, wheeled road vehicles, tracked ground vehicles (i.e., tanks), and the like.

Figure 1:
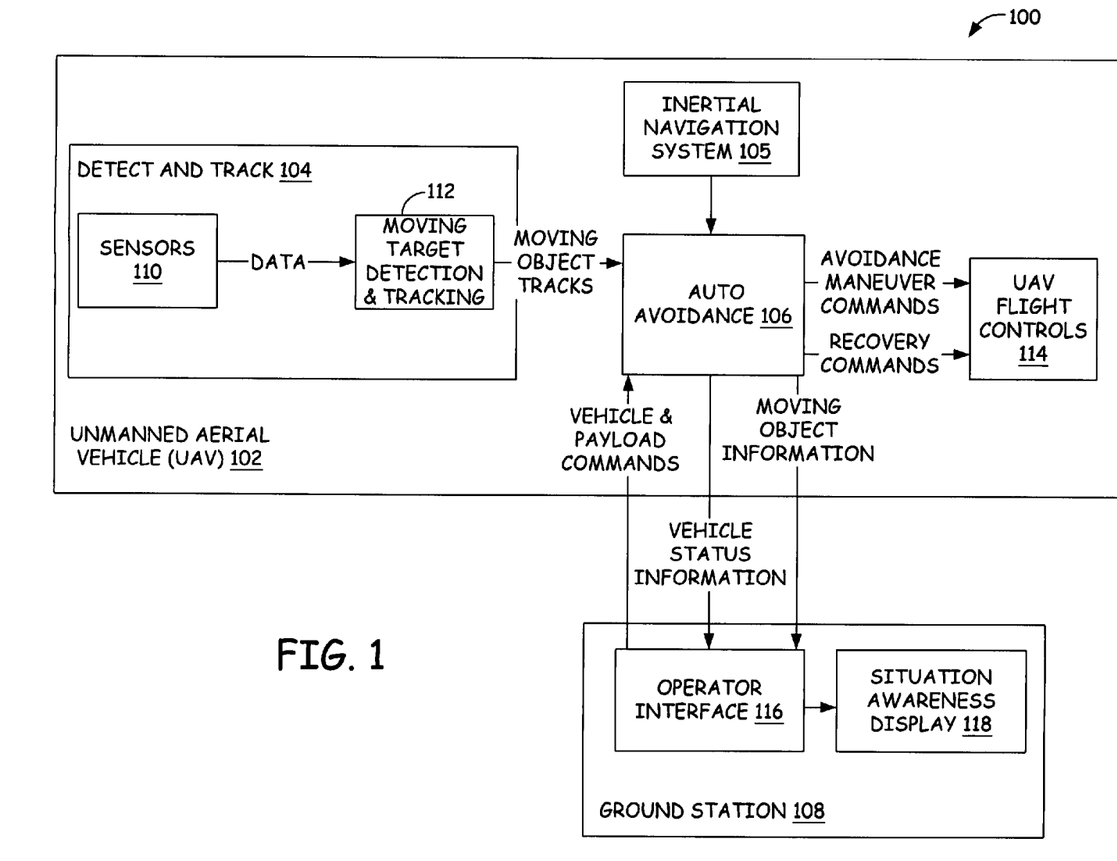
FIG. 1 illustrates a simplified block diagram of a collision avoidance system in accordance with an embodiment of the present invention.

FIG. 1 illustrates a simplified block diagram of autonomously controlled collision avoidance system 100 as implemented in a UAV 102 in accordance with an embodiment of the present invention. Collision avoidance system 100 includes a detect and track module 104 coupled to an auto avoidance module 106 which is in communication with a ground control station 108, an inertial navigation system 105 and flight controls 114.

Detect and track module 104 includes sensors 110 and moving target detection and tracking module 112. In one embodiment, sensors 110 include video or optical cameras that use visible-light wavelength detector arrays and can optically sense various objects within a particular range depending at least on camera quality and resolution capability. Sensors 110 are configured to take real-time video, typically digital video, of the environment in which UAV 102 is flying. For example, the video is provided to moving target detection and tracking module 112. In another embodiment, sensors 110 could be non-visual sensors, such as radio frequency (RF), laser, infrared (IR) or sonar. Module 112, using sensed information, is configured to provide moving object tracks to auto avoidance module 106. Inertial navigation system 105 provides auto avoidance 106 with information related to velocity, position and angular position of UAV 102.

Based on the moving object tracks provided by detect and track 104 and information provided by inertial navigation system 105, auto avoidance module 106 is able to generate the best estimate of position and velocity for the object of collision. Auto avoidance module 106 also calculates various relative or navigational states of the object of collision with respect to UAV 102 and generates guidance maneuver commands for flight controls 114 to avoid the potential object of collision. In addition, module 106 communicates with ground control station 108. Module 106 can relay status information, such as information related to position and velocity of UAV 102 and information related to the potential object of collision, to ground control station 108 through an operator interface 116. In accordance with one embodiment, the navigational status information alerts an operator that UAV 102 is on a course to collide with an object. Relaying status information gives the operator a chance to take over flight controls 114 to manually avoid the object and/or notify the operator that UAV 102 will enter an auto avoidance guidance mode. The status information also relays information related to potential objects of collision to a situation awareness display 118 via operator interface 116.

Situational awareness display 118 illustratively displays synthetic imagery of operator situational awareness. For example, situational awareness display 118 incorporates commercial off-the-shelf technology developed by SDS International of Arlington, Va. The synthetic imagery illustratively provides synthetic real-time displays of two-dimensional and/or three-dimensional views of UAV 102 and its surroundings as it flies within a particular airspace. For example, if current weather conditions are hazy or cloudy, the synthetic imagery displays UAV 102 in a clear synthetic corresponding environment. Auto avoidance module 106 provides information about a potential object of collision to situation awareness display 118 such that ground control station 108 can instruct situation awareness display 118 to generate visuals of objects based on the real-time position of the objects.

Figure 2:
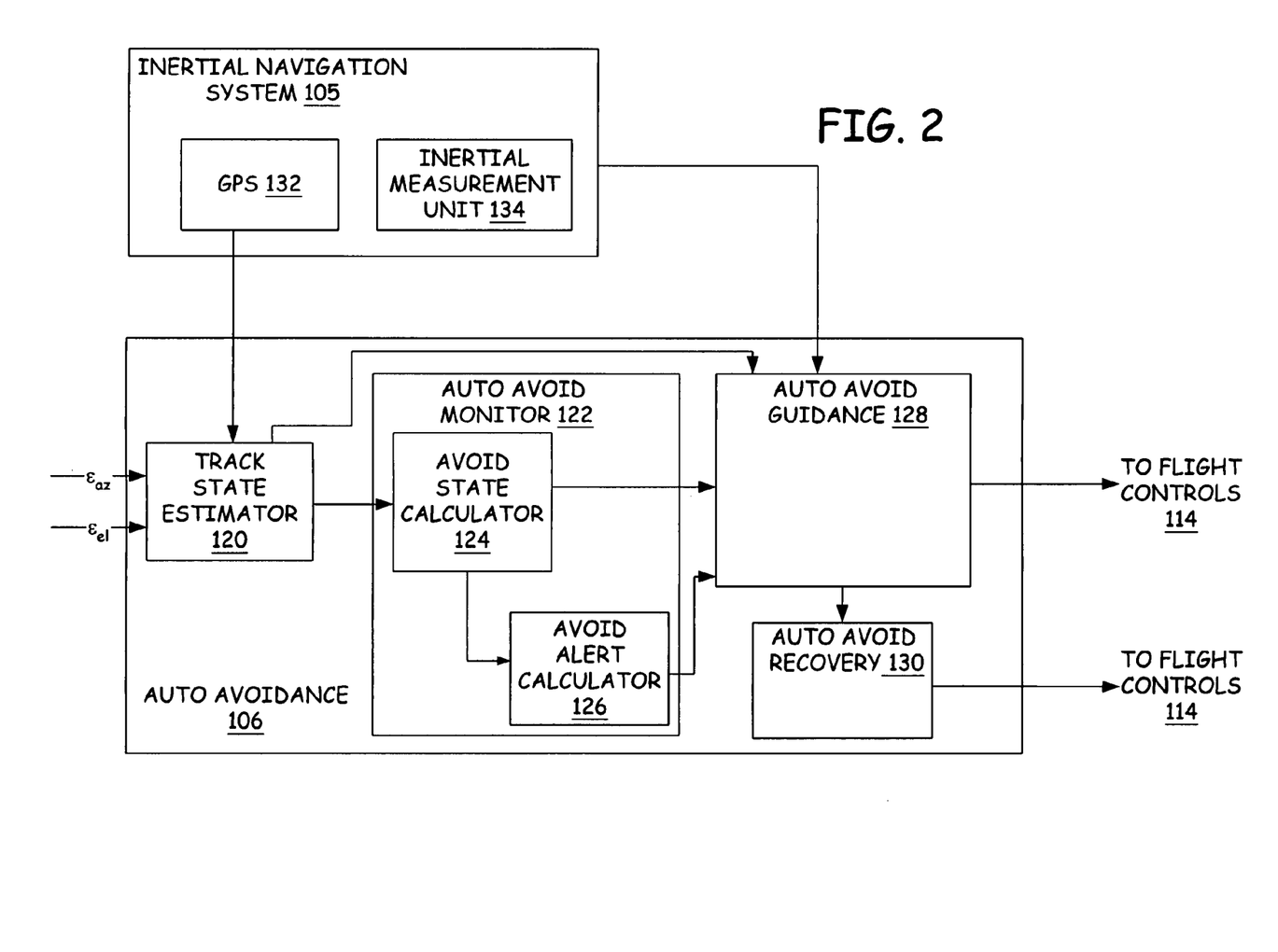
FIG. 2 illustrates a simplified block diagram of an auto avoidance module in accordance with an embodiment of the present invention.

FIG. 2 illustrates a simplified block diagram of auto avoidance module 106 and inertial navigation system 105 in accordance with an embodiment of the present invention. Auto avoidance module 106 includes a track state estimator 120. Track state estimator 120, in the current embodiment, is configured to receive moving object tracks in the form of elevation $\epsilon_{el}$ and azimuth $\epsilon_{az}$ direction finding (DF) angle information relative to the visual sensor bore sight. It should be noted that those skilled in the art could incorporate other track state information from detect and track module 112 in track state estimator 120. For example, range, closing velocity ($V_C$) and DF rates can be incorporated from detect and track module 112. Track state estimator 120 is also configured to receive estimations of position and velocity for UAV 102 provided by inertial navigation system 105. Inertial navigation system 105 includes a global positioning system (GPS) 132 and an inertial measurement unit 134. These sensors are coupled with strapdown equations and a sensor error estimator such that the best estimate of position, velocity and angular position are determined for UAV 102. In addition, information determined by inertial navigation system 105 is also configured to be received by auto avoid guidance 128 to aid in guiding UAV 102 away from an object of collision. Track state estimator 120 uses the DF angle information and the best estimate of position and velocity of UAV 102 to estimate the relative range vector $\overline{R}$, the relative range rate vector $\dot{\overline{R}}$, a line-of-sight angle vector $\overline{\lambda}_{LOS}$ and a line-of-sight rate vector $\dot{\overline{\lambda}}_{LOS}$ between UAV 102 and the potential object of collision.

In accordance with one embodiment of the present invention, track state estimator 120 is an Extended Kalman Filter. Extended Kalman Filters are well known in the art. A detailed discussion of Extended Kalman Filters is described in the article by Taek L. Song et al. titled "Suboptimal Filter Design with Pseudomeasurements for Target Tracking". 1988. IEEE Transactions on Aerospace and Electronic Systems. Vol. 24. However, those skilled in the art should recognize that track state estimator 120 can utilize other types of mathematical systems that provide estimations of past, present and future states of an object based on DF angles obtained by various types of sensors.

The information determined and provided by track state estimator 120 is received by auto avoid monitor 122 to determine various parameters that forecast future collisions and received by auto avoid guidance 128 to develop guidance commands that divert the path of UAV 102 to avoid such a collision. Auto avoid monitor 122 includes an avoid state calculator 124 and an avoid alert calculator 126. Avoid state calculator 124 takes the information estimated by track state estimator 120 and calculates various navigational states. For example, avoid state calculator 124 determines a time-to-go) ($t_{go}$) to the closest point of approach based on current velocity and range profiles, the relative closing velocity ($V_C$) along the line of sight between the object and UAV 102 and the zero effort miss distance (ZEM) or closest point of approach based on non-accelerated current velocity and range profiles. Currently, FAA guidelines require that a vehicle must miss another vehicle by 500 feet. Thus, the avoidance maneuver of the present invention illustratively guarantees at least a 500-foot miss (of course, any other range is within the scope of the present invention). In addition, the minimum miss distance or ZEM is used as an indicator to terminate the avoidance maneuver and return UAV 102 to its prior path.

Avoid alert calculator 126 calculates an alert avoid flag and a head-on flag based on ZEM. The head-on flag indicates that UAV 102 is on course to collide with the potential object of collision head-on. The alert avoid flag indicates that UAV 102 is on course to enter in to some other type of collision. Both head-on flag and alert avoid flag should activate auto avoid guidance 128 to avoid an object. Auto avoid guidance 128 receives the calculated parameters from avoid state calculator 124, the alert avoid flag as well as the head-on indicator to override the existing guidance mode of UAV 102. Auto avoid guidance 128 maneuvers UAV 102 by generating avoidance maneuver commands for flight controls 114 to avoid a collision and miss an approaching object by at least the predetermined miss distance. Auto avoid guidance 128 can also use an active transponder system, used in commercial aviation, to inject commands into auto avoid guidance module 128.

In accordance with one embodiment, auto avoid guidance 128 is programmed to make an avoidance maneuver according to the FAA's "rules of the road" for civilian aircraft operating in National Air Space (NAS). In particular, the avoidance maneuver complies with Part 91 of the FAA regulations and meets the FAA's Collision Avoidance Systems Final Rule FAA-2001-10910-487 and FAA 2001-10910-489. After auto avoid guidance 128 completes a maneuver, auto avoid recovery 130 generates recovery commands for flight controls 114 such that UAV 102 gracefully resumes the previous guidance mode.

Figure 3:
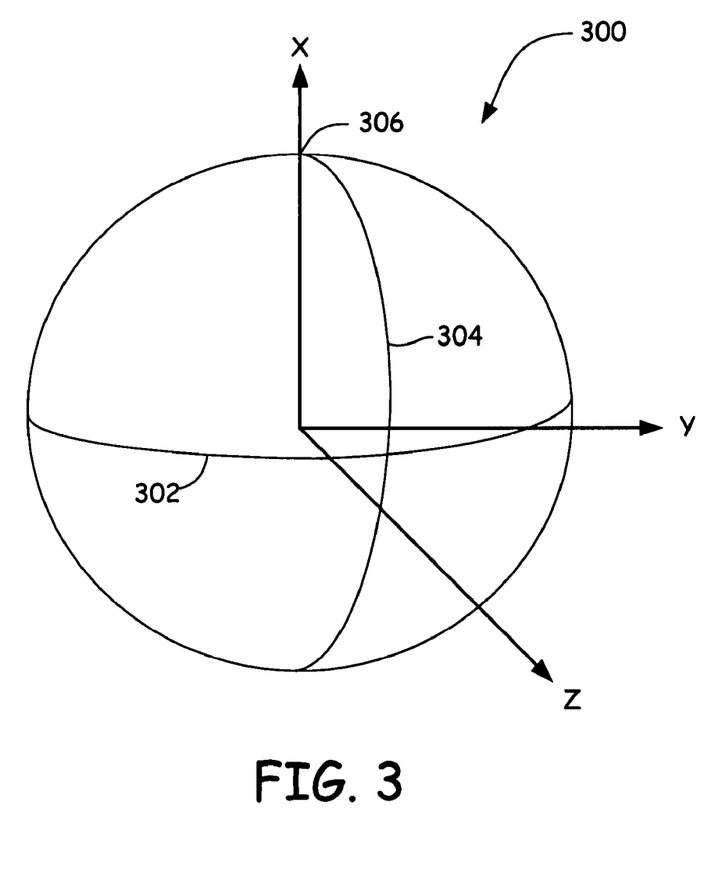
FIG. 3 illustrates an earth centered, earth fixed (ECEF) reference frame.

FIG. 3 illustrates an earth centered, earth fixed (ECEF) reference frame 300. ECEF reference frame 300 is oriented with its origin at the earth center, wherein the x-axis and the y-axis lie in the equatorial plane 302 with the x-axis passing through the Greenwich Meridian 304. The z-axis is normal to the x-y plane and passes through the North Pole 306.

Figure 41:
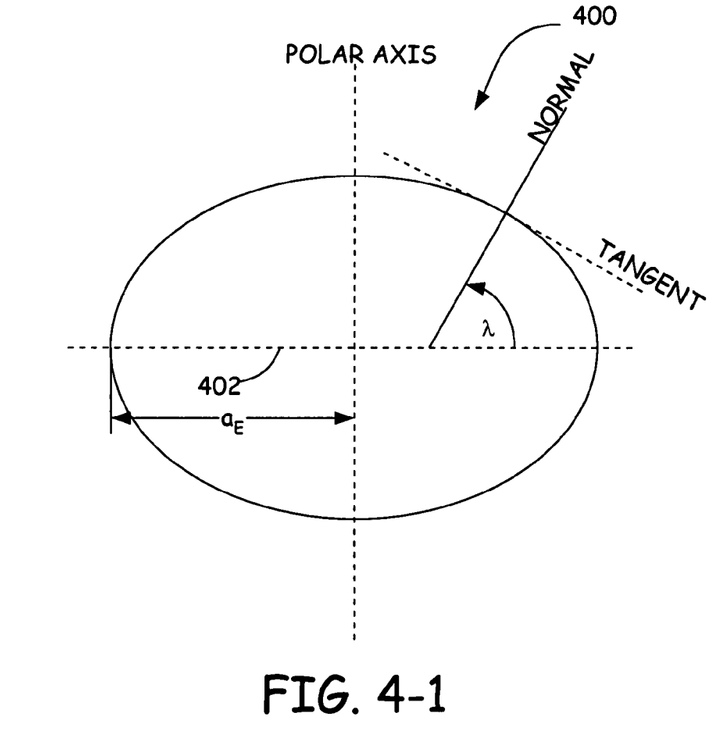

FIG. 4-1 illustrates a geodetic reference frame 400 that defines the lines of latitude λ and longitude l along the earth's surface. Geodetic latitude λ is the angle between the equatorial plane 402 and the normal to the surface of an ellipsoid. Geodetic longitude l is the angular rotation relative to the ECEF x-axis in the equatorial plane 402. Geodetic altitude h (not shown) is the elevation above the ellipsoid surface.

Figure 42:
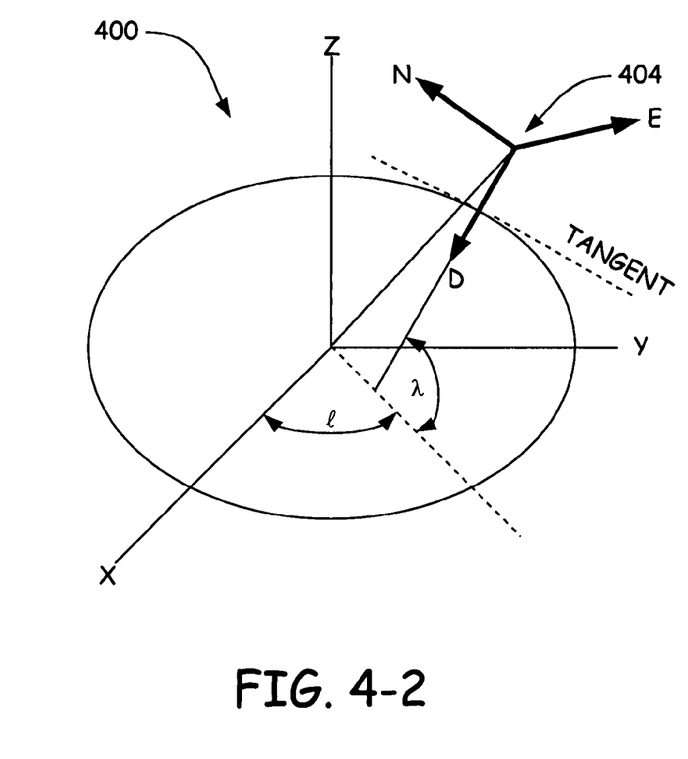

FIG. 4-2 illustrates a local vertical coordinate frame 404 with respect to the geodetic reference frame 400. The local vertical reference frame 404 is illustrated as a north, east, down (NED) reference frame. The NED reference frame is a right handed, orthogonal coordinate system oriented at the surface of the Earth's ellipsoid. The z-axis is tangent to the normal of the Earth surface ellipsoid and has its positive direction pointing into earth. The positive x-axis points towards true north and the positive y-axis points towards the East.

Certain embodiments of the present invention involve coordinate frame transformations. For example, a function can be applied to transform local vertical (NED) coordinates to body frame coordinates. In this example transformation, the following 3×3 transformation matrix (TBL Matrix):

$$TBL = \begin{bmatrix} \cos\psi\cos\theta & \sin\psi\cos\theta & -\sin\theta \\ (\cos\psi\sin\theta\sin\phi) + & (\sin\psi\sin\theta\sin\phi) + & \cos\theta\sin\phi \\ (\sin\psi\cos\phi) & (\cos\psi\cos\theta) & \\ (\cos\psi\sin\theta\cos\phi) + & (\sin\psi\sin\theta\cos\phi) - & \cos\theta\cos\phi \\ (\sin\psi\sin\phi) & (\cos\psi\sin\phi) & \end{bmatrix} \quad \text{Equation 1}$$

where θ is the pitch angle, Ψ is the yaw angle and φ is the roll angle of UAV 102.

Figure 5:
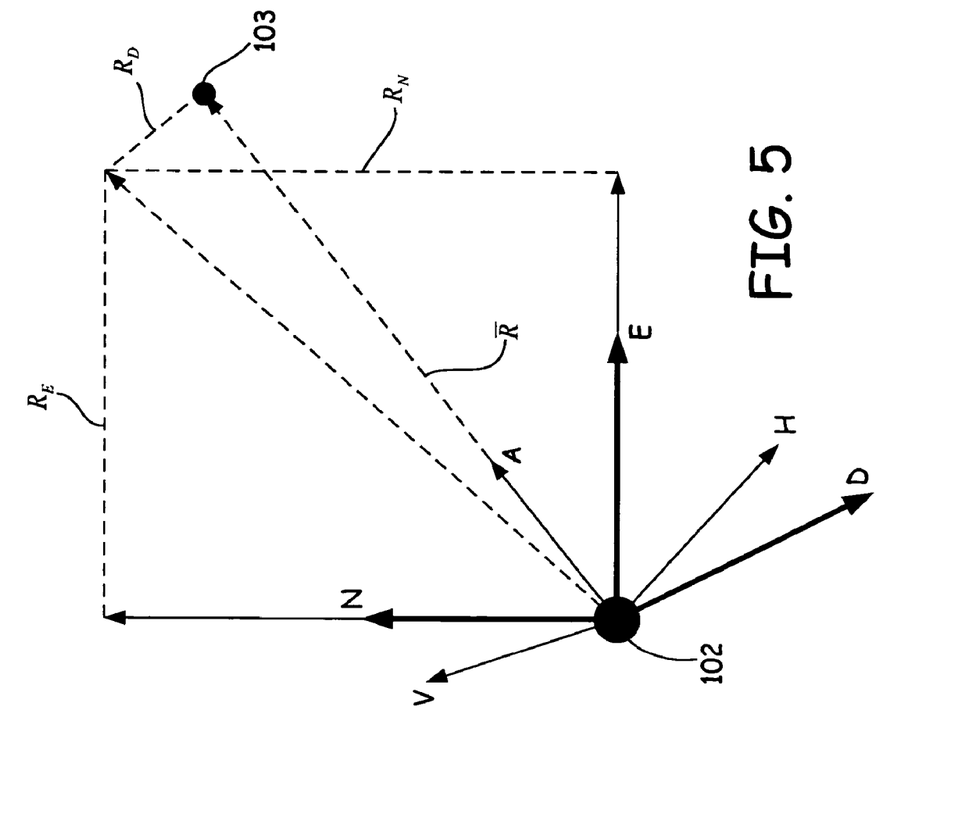
FIG. 5 illustrates a local vertical reference frame and line of sight reference frame.

FIG. 5 illustrates a local vertical coordinate frame showing the north, east and down (NED) components relative to UAV 102 and an object of collision 103. In addition, FIG. 5 illustrates a line of sight (LOS) coordinate frame, wherein the three components are labeled A, H and V in relation to the local vertical reference frame. Local vertical can be transformed into the LOS coordinate frame or vice versa based on the range components of the NED coordinate frame.

Upon detect and track module 104 (FIG. 1) detecting an object, track state estimator 120 of FIG. 2 is configured to receive the corresponding elevation angle $\epsilon_{el}$ azimuth angle $\epsilon_{az}$ of the potential object of collision and is configured to receive positional and velocity information from inertial navigation system 105. Based on this information, track state estimator 120 determines the position vector $\overline{P}_{OBJ,LV}$ and the velocity vector $\overline{V}_{OBJ,LV}$ of the potential object of collision in local vertical coordinates.

Track state estimator 120 uses these position and velocity values of the potential object of collision and position and velocity values of UAV 102 to calculate the relative range vector $\overline{R}$ of the potential impediment with respect to UAV 102, the relative range rate vector $\dot{\overline{R}}$, the line of sight rate vector $\dot{\overline{\lambda}}$, the line of sight angle vector $\overline{\lambda}$, the range magnitude R and the range rate $\dot{R}$. The values of relative range vector, relative range rate vector, line of sight angle vector and line of sight rate vector are all computed into local vertical coordinates. For example local vertical coordinates can be based on a North, East, Down (NED) reference frame 404 as illustrated in FIG. 4-2.

The relative range vector $\overline{R}$ (illustrated in FIG. 5) and range rate vector $\dot{\overline{R}}$ are the differences between the position and velocity of the potential object of collision and the position and velocity of UAV 102 as illustrated in the following equation:

$$\overline{R} = \overline{P}_{OBJ,LV} - \overline{P}_{UAV,LV} \quad \text{Equation 2}$$

$$\dot{\overline{R}} = \overline{V}_{OBJ,LV} - \overline{V}_{UAV,LV} \quad \text{Equation 3}$$

The line of sight angle vector $\overline{\lambda}$ is calculated by:

$$\lambda_D = \arctan(R_E, R_N) \quad \text{Equation 4}$$

$$\lambda_E = \arctan\left(-R_D, \sqrt{R_N^2 + R_E^2}\right) \quad \text{Equation 5}$$

where $\lambda_D$ is the down component of the line of sight angle, $\lambda_E$ is the east component of the line of sight angle, $R_N$ is the north component of the range vector (shown in FIG. 5), $R_E$ is the east component of the range vector (shown in FIG. 5) and $R_D$ is the down component of the range vector (shown in FIG. 5). The line of sight rate vector $\dot{\overline{\lambda}}$ is the angular rate of change of the line of sight vector and is calculated by:

$$\dot{\overline{\lambda}} = \frac{\overline{R} \times \dot{\overline{R}}}{R^2} \quad \text{Equation 6}$$

where $\overline{R}$ is the relative range vector of the potential object of collision with respect to UAV 102, $\dot{\overline{R}}$ the relative range rate vector of the potential object of collision with respect to UAV 102 and R is the magnitude of the relative range and is calculated by:

$$R = \sqrt{R_N^2 + R_E^2 + R_D^2} \quad \text{Equation 7}$$

where $R_N$ is the north component of the relative range, $R_E$ is the east component of the relative range and $R_D$ is the down component of the relative range.

In accordance with an embodiment of the present invention, avoid state calculator 124 receives the relative range magnitude R, the relative range rate $\dot{R}$ and the line of sight rate vector $\dot{\overline{\lambda}}$ as determined and calculated by track state estimator 120.

Avoid state calculator 124 calculates a closing velocity $V_C$ and a time-to-go $t_{go}$ based on the relative range R and relative range rate $\dot{R}$. The closing velocity is the relative velocity along the line of sight between UAV 102 and the potential object of collision. Closing velocity is equal to the relative range rate provided by track state estimator 120 and is calculated by:

$$V_C = -\frac{\overline{R} \cdot \dot{\overline{R}}}{R} \quad \text{Equation 8}$$

where $\overline{R}$ is the relative range vector, $\dot{\overline{R}}$ is the relative range rate vector and R is the relative range magnitude.

Time-to-go $t_{go}$ is the amount of time until UAV 102 is at its closest point of approach to the potential object of collision assuming both the potential object of collision and UAV 102 continue at constant non-accelerating velocities. Time-to-go is calculated by:

$$t_{go} = \frac{R}{V_C} \qquad \text{Equation 9}$$

where R is the magnitude of the relative range vector and $V_C$ is the closing velocity as calculated in Equation 8. The calculation of closing velocity and the calculating of time-to-go are used for guiding UAV 102 away from an object as well as in the calculation of ZEM.

Avoid state calculator 124 also calculates ZEM of UAV 102. ZEM is the estimated zero miss distance or closest point of approach vector that UAV 102 will be with respect to the potential object of collision based on current velocity and range profiles. ZEM is calculated by:

$$ZEM = \vec{\lambda} V_C t_{go}^2 \qquad \text{Equation 10}$$

where $\vec{\lambda}$ is the relative range rate vector of UAV 102, $V_C$ is the closing velocity as calculated by Equation 8 and $t_{go}$ is time-to-go as calculated in Equation 9.

Referring back to FIG. 2, auto avoid monitor 122 includes an avoid alert calculator 126 configured to determine when a head-on flag and an avoid alert flag should be activated. To activate an avoid alert flag, avoid alert calculator 126 compares the magnitude of ZEM to the predetermined miss distance limit, such as 500 feet, or a predetermined allowable miss distance from the potential object of collision. If the ZEM is greater than the predetermined allowable miss distance, then the avoid alert flag is not activated. If, however, the ZEM is less than the predetermined allowable miss distance, then the avoid alert flag is activated. The alert flag remains activated until the ZEM becomes greater than the predetermined deactivation distance, which is greater than the allowable miss distance. This creates a hysterisis effect that prevents the alert flag from entering a cycle in which it is activated and deactivated repeatedly.

Figure 6:
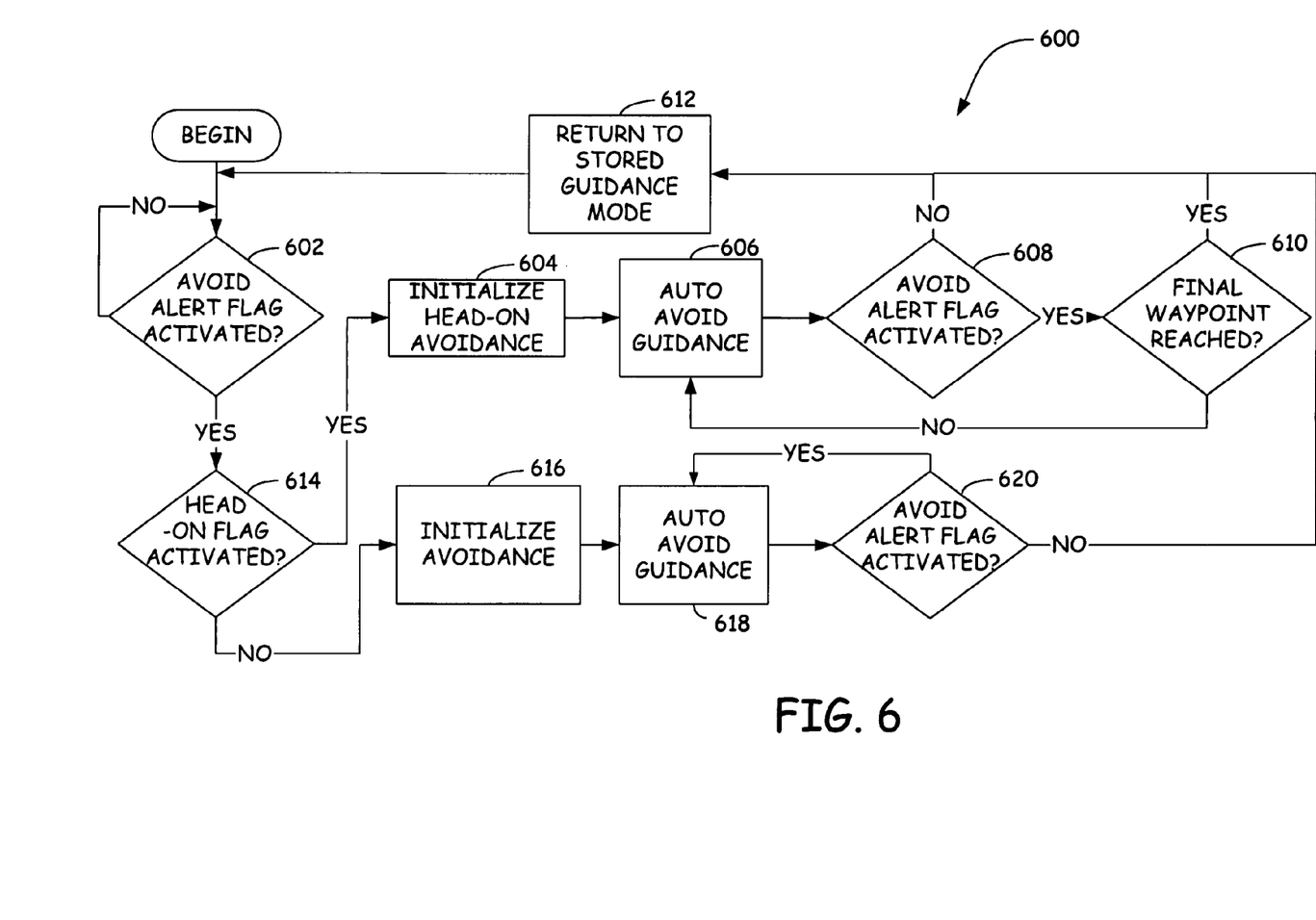
FIG. 6 illustrates a guidance logic routine in accordance with an embodiment of the present invention.

Upon auto avoid guidance 128 receiving an avoid alert flag from avoid alert calculator 126 and/or a head-on flag, auto avoid guidance 128 begins a guidance logic routine that continues as long as auto avoid monitor 122 predicts that UAV 102 will approach an object within the predetermined miss distance. FIG. 6 illustrates such a routine 600 as implemented by auto avoid guidance 128 in accordance with an embodiment of the present invention.

Routine 600 begins at block 602 and determines whether an avoid alert flag has been activated by auto avoid calculator 126. If an avoid alert flag is activated, then control passes to block 614 to determine if a head-on flag has been activated. Routine 600 continues to determine if an avoid alert flag has been activated until auto avoid calculator activates an avoid alert flag.

If a head-on flag is activated, then routine 600 proceeds to block 604 initializes head-on avoidance. At block 604, a head-on collision maneuver under auto avoid guidance is activated and a waypoint leg is calculated. A waypoint leg is calculated which consists of at least two waypoints parallel to the current vehicle heading that are offset by a predetermined amount to ensure that the miss distance is achieved. After calculation of the waypoint leg, auto avoid guidance 128 begins guidance of UAV 102 at block 606. At block 608, the routine determines whether the avoid alert flag is still activated. If the avoid alert flag is still activated, then the routine passes to block 610 to determine if the final waypoint of the waypoint leg has been reached. If the avoid alert flag is not activated, then control passes to block 612 and auto avoid guidance returns UAV 102 back to the stored or previous guidance mode as set in initialization. If the final waypoint leg has been reached, then control also passes to block 612. If the final waypoint has not been reached, then control passes back to block 606 to continue auto avoid guidance. The routine passes through blocks 608 and 610 until either the avoid alert flag is not activated or the final waypoint has been reached.

Referring back to block 614, if, however, a head-on flag is not activated, then the routine passes to block 616 to initialize avoidance. At block 618, an inverse homing command is calculated and designed to guide UAV 102 off of the collision trajectory it is on. Under the inverse homing commands, auto avoid guidance 128 alters UAV 102 away from the object of collision and recalculates the ZEM to determine if UAV 102 is still on course to collide with the object of collision. If the recalculation still indicates that UAV 102 is on course to collide, then auto avoid guidance repeats altering UAV 102 away from the object of collision until UAV 102 Is no longer on course to collide with an object of collision.

The calculated acceleration commands are generated normal to the current line of sight vector to the object of collision as shown below:

$$n_c = \frac{-N(ZEM_{Desired} - ZEM)}{t_{go}^2} \qquad \text{Equation 11}$$

where $n_c$ is the acceleration command in local vertical coordinates, N is the guidance gain for avoidance, ZEM is the current Zero Effort Miss as calculated in Equation 10 by auto avoid monitor 122, $ZEM_{Desired}$ is the desired zero effort miss, and $t_{go}$ is the time to go as calculated in Equation 9 by the auto avoid monitor 122. $ZEM_{Desired}$ is most appropriately defined in the LOS frame (illustrated in FIG. 5) and then transformed into the local vertical frame to support the previous calculation.

At block 620, the routine determines if the alert avoid flag is still activated. If the avoid alert flag is still activated, then control passes back to block 618 to continue guiding UAV 102 away from the object of collision. If, however, the alert avoid flag is not activated, then control passes to block 612 to return UAV 102 back to the stored or previous guidance mode.

Although the present invention has been described in detail with respect to a control system for an unmanned aerial vehicle, the present invention is applicable to any vehicle control system or autopilot. In addition, although not specifically described, in one embodiment of the present invention, auto avoid guidance 128 (FIG. 2) supplies flight controls 114 (FIG. 2) with acceleration vectors in order to guide UAV 102 away from an object of collision. This acceleration vector can be used to accommodate any vehicle control system. If a particular vehicle control system does not accept an acceleration vector for its autopilot, the acceleration vector can be translated into a suitable parameter in order to guide a vehicle away from an object of collision.

Although the present invention has been described with reference to preferred embodiments, workers skilled in the art will recognize that changes may be made in form and detail without departing from the spirit and scope of the invention.

What is claimed is:

1. An autonomous collision avoidance system for an unmanned aerial vehicle comprising:
   a detect and track module configured to sense a potential object of collision and generate a moving object track for the potential object of collision;
   an inertial navigation system configured to provide information indicative of a position and a velocity of the unmanned aerial vehicle; and
   an auto avoidance module configured to receive the moving object track for the potential object of collision and the information indicative of the position and the velocity of the unmanned aerial vehicle, the auto avoidance module configured to utilize the moving object track of the potential object of collision and the information indicative of the position and the velocity of the unmanned aerial vehicle to determine a line of sight rate vector, and configured to calculate a zero effort miss distance as a function of the line of sight rate vector, the zero effort miss distance being a closest point of approach between the unmanned aerial vehicle and the potential object of collision, the auto avoidance module configured to compare the zero effort miss distance to a predetermined miss distance limit, the auto avoidance module configured to generate a guidance maneuver command that facilitates the unmanned aerial vehicle avoiding the potential object of collision by at least the predetermined miss distance limit based at least in part upon a determination that the zero effort miss distance is less than the predetermined miss distance limit.

2. The system of claim 1, further comprising:
   flight controls configured to receive the guidance maneuver command and utilize the guidance maneuver command to re-direct a course of the unmanned aerial vehicle to avoid the potential object of collision.

3. The system of claim 1, wherein the auto avoidance module includes a track state estimator configured to receive the moving object track in a form of an elevation angle and an azimuth direction finding angle.

4. The system of claim 3, wherein the elevation angle and the azimuth direction finding angle are relative to a sensor bore sight.

5. The system of claim 1, wherein the inertial navigation system includes a global positioning system and an inertial measurement unit.

6. The system of claim 1, wherein the auto avoidance module includes an auto avoid recovery unit configured to generate a recovery command, the recovery command returning the unmanned aerial vehicle to a previous guidance mode.

7. A method for autonomously controlling an unmanned aerial vehicle comprising:
   utilizing a sensor to scan for a potential object of collision;
   utilizing data collected from the sensor to generate a moving object track for the potential object of collision;
   determining a position and a velocity of the unmanned aerial vehicle;
   generating an estimate of a position and a velocity of the potential object of collision based at least in part on the moving object track and on the position and velocity of the unmanned aerial vehicle;
   determining whether the unmanned aerial vehicle is on course to enter within a predetermined distance relative to the potential object of collision;
   activating two different alert flags based at least in part upon a determination that the unmanned aerial vehicle is on course to enter within the predetermined distance relative to the potential object of collision;
   altering the course of the unmanned aerial vehicle based at least in part on the activation of at least one of the two different alert flags;
   determining, after the course of the unmanned aerial vehicle has been altered, whether the unmanned aerial vehicle is on course to enter within the predetermined distance relative to the potential object of collision;
   deactivating the at least one of the two different alert flags based at least in part upon a determination that the unmanned aerial vehicle is not on course to enter within the predetermined distance relative to the potential object of collision; and
   returning the unmanned aerial vehicle to a previous guidance mode based at least in part on the deactivation of the at least one of the two different alert flags.

8. The method of claim 7, wherein a first one of the two different alert flags provides an indication of whether the unmanned aerial vehicle is on course to collide head-on with the potential object of collision and wherein a second one of the two different alert flags provides an indication of whether the unmanned aerial vehicle is on course to enter into another type of collision with the potential object of collision.

9. The method of claim 7, wherein altering the course comprises guiding the unmanned aerial vehicle away from the potential object of collision according to civilian aircraft operating rules.

10. The method of claim 7, wherein altering the course comprises calculating a waypoint leg to alter the course of the unmanned aerial vehicle.

11. The method of claim 7, wherein returning the unmanned aerial vehicle to a previous guidance mode comprises restoring a previous course of the unmanned aerial vehicle after the unmanned aerial vehicle has avoided the potential object of collision.

12. The method of claim 7, further comprising:
    sending an indication of a collision status from the unmanned aerial vehicle to a ground control station.

13. An autonomous collision avoidance system for an unmanned aerial vehicle comprising:
    a sensor configured to detect an elevation angle and an azimuth angle of a potential object of collision;
    an inertial navigation system configured to provide information indicative of a velocity, a position, and an angular position of the unmanned aerial vehicle;
    a track state estimator configured to receive information indicative of the potential object of collision elevation angle, the potential object of collision azimuth angle, the unmanned aerial vehicle velocity, the unmanned aerial vehicle position, and the unmanned aerial vehicle angular position, the track state estimator configured to utilize the received information to determine a line of sight rate vector, a relative range magnitude, and a relative range rate of the unmanned aerial vehicle relative to the potential object of collision; and
    an avoid state calculator configured to receive information indicative of the line of sight rate vector, the relative range magnitude, and the relative range rate, the avoid state calculator configured to utilize the received information to determine a zero effort miss distance of the unmanned aerial vehicle relative to the potential object of collision.

14. The system of claim 13, further comprising:
an avoid alert calculator configured to receive the zero effort miss distance and compare the zero effort miss distance to a predetermined allowable miss distance, the avoid alert calculator configured to generate an alert flag upon the zero effort miss distance being less than the predetermined allowable miss distance.

15. The system of claim 14, further comprising:
an auto avoid guidance module that, upon receiving the alert flag, is configured to generate a command to re-direct a course of the unmanned aerial vehicle to avoid the potential object of collision.

16. The system of claim 15, further comprising:
an auto avoid recovery unit configured to generate a recovery command that returns the unmanned aerial vehicle to a previous guidance mode.

17. The system of claim 14, wherein an indication of the alert flag is sent to a ground station.

18. The system of claim 14, wherein the alert flag indicates a head-on collision.

19. The system of claim 14, wherein the alert flag indicates a non-head-on collision.

* * * * *